United States Patent [19]

Stava

[11] Patent Number: 5,148,001
[45] Date of Patent: Sep. 15, 1992

[54] SYSTEM AND METHOD OF SHORT CIRCUITING ARC WELDING
[75] Inventor: Elliott K. Stava, Brecksville, Ohio
[73] Assignee: The Lincoln Electric Company, Cleveland, Ohio
[21] Appl. No.: 577,105
[22] Filed: Sep. 4, 1990

Related U.S. Application Data

[60] Continuation-in-part of Ser. No. 404,769, Sep. 8, 1989, Pat. No. 4,972,064, and Ser. No. 475,555, Feb. 6, 1990, Pat. No. 5,001,326, which is a continuation-in-part of Ser. No. 404,769, Sep. 8, 1989, Pat. No. 4,972,064, which is a division of Ser. No. 270,766, Nov. 14, 1988, Pat. No. 4,866,247, which is a continuation-in-part of Ser. No. 135,832, Dec. 21, 1987, abandoned, which is a continuation-in-part of Ser. No. 940,580, Dec. 11, 1986, Pat. No. 4,717,807.

[51] Int. Cl.$^5$ .............................................. B23K 9/09
[52] U.S. Cl. ........................... 219/137 PS; 219/130.1
[58] Field of Search ...................... 219/130.21, 137 PS, 219/130.31, 130.32, 130.33, 130.51, 130.1

[56] References Cited

U.S. PATENT DOCUMENTS

| | | | |
|---|---|---|---|
| 3,423,564 | 1/1969 | Sevenco | 219/131 |
| 3,459,920 | 8/1969 | Sevenco | 219/131 |
| 3,627,975 | 12/1971 | Goto | 219/131 F |
| 3,792,225 | 2/1974 | Needham | 219/131 R |
| 3,809,853 | 5/1974 | Manz | 219/137 |
| 4,020,320 | 4/1977 | Pijls | 219/137 PS |
| 4,544,826 | 10/1985 | Nakanishi | 219/137 PS |
| 4,546,234 | 10/1985 | Ogasawara | 219/137 PS |
| 4,717,807 | 1/1988 | Parks et al. | 219/130.21 |
| 4,794,232 | 12/1988 | Kimbrough | 219/130.51 |
| 4,866,247 | 9/1989 | Parks et al. | 219/137 |

FOREIGN PATENT DOCUMENTS

| | | | |
|---|---|---|---|
| 1565157 | 2/1970 | Fed. Rep. of Germany . | |
| 57-19163 | 2/1982 | Japan | 219/130.32 |
| 57-56161 | 4/1982 | Japan | 219/130.51 |
| 58-173082 | 10/1983 | Japan | 219/130.51 |

OTHER PUBLICATIONS

A Power Source for Advanced Welding Systems, by P. Budai et al., First International Conference on Advanced Welding Systems, Nov. 1985.
Control of Short Circuiting in MIG Welding, P. Boughton et al., Welding Research International, 1974 ED.
Patent Abstracts of Japan, vol. 10, No. 83 (M-466), [2140], Apr. 2, 1986.
Patent Abstracts of Japan, vol. 9, No. 202 (M-405), [1925], Aug. 20, 1985.
Patent Abstracts of Japan, vol. 4, No. 161 (M-40) [643], Nov. 11, 1980.
Study of Welding Arc Control in China, 231 Welding Journal, 65, (1986), Mar., No. 3, Miami, Fla. U.S.A., by J. L. Pan.
European Search Report, Appln. Ser. No. 87302155.4, Apr. 28, 1988.
A Power Source for Gas Shielded Arc Welding with New Current Wave Forms, by T. Ogasawara et al., First International Conference on Advanced Welding Systems, Nov. 1985.

Primary Examiner—Clifford C. Shaw
Attorney, Agent, or Firm—Body, Vickers & Daniels

[57] ABSTRACT

There is provided an improvement in a short circuiting arc welding system comprising a work station with a consumable electrode and workpiece, a D.C. power supply with a positive and a negative terminal, high frequency current control means for applying a welding circuit with a given time-based profile across the work station while the electrode is short circuited and while the electrode is spaced from the workpiece, a welding current circuit means including a first means for creating a first inductive reactance in series with the current control means and work station whereby the welding current follows the time-based profile in accordance with the first inductive reactance. The improvement comprises a background current circuit means between the power supply and the work station and in parallel with the current control means and first means for applying continuously a background current across the work station. This background current circuit means includes a second means for creating a second inductive reactance substantially greater than the first inductive reactance and a resistor means for controlling the background current flowing continuously from the power supply to the work station through the background current circuit means.

46 Claims, 3 Drawing Sheets

SYSTEM AND METHOD OF SHORT CIRCUITING ARC WELDING

DISCLOSURE

This application is a continuation-in-part of copending applicaton Ser. No. 404,769 filed Sep. 8, 1989, now U.S. Pat. No. 4,972,064 which is a divisional of prior copending application Ser. No. 270,766 filed Nov. 14, 1988, now U.S. Pat. No. 4,866,247 which is a continuation-in-part of prior copending application Ser. No. 135,832 filed Dec. 21, 1987, now abandoned, which is in turn a continuation-in-part of prior application Ser. No. 940,580 filed Dec. 11, 1986, now U.S. Pat. No. 4,717,807; this application is also a continuation-in-part of copending application Ser. No. 475,755 filed Feb. 6, 1990, now U.S. Pat. No. 5,001,326 which is a continuation-in-part of prior copending application Ser. No. 404,769 filed Sep. 8, 1989.

This invention relates to of arc welding using a consumable electrode and more particularly to an improved apparatus and method of short circuiting arc welding.

INCORPORATION BY REFERENCE

The present invention relates to an improvement in spatter control systems of the general type described in U.S. Pat. No. 4,866,247 and U.S. Pat. No. 4,717,807. The prior issued patents are incorporated by reference herein as background information and for their discussion of concepts in the spatter control area to which the present invention is specifically directed. U.S. Pat. No. 4,866,247 discloses in detail certain features of the present invention.

Also incorporated by reference is prior application Ser. No. 404,769 filed Sep. 8, 1989.

BACKGROUND

In recent years, a substantial amount of effort has been devoted to improving short circuiting arc welding by controlling portions of a welding cycle constituting a short circuit condition followed by an arcing condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by the power supply control circuit. In addition, a premonition circuit is usually provided so that a given increase in dv/dt signals the imminent formation of the fuse. Consequently, the welding current can be dropped to a background level $I_B$ or lower immediately before the fuse occurs. In this fashion, the energy of the fuse during each welding cycle is drastically reduced. This reduces spatter at the termination of the short circuit condition. Various circuits for controlling the current flow during the short circuit portion or condition of the welding cycle are known in the art as spatter control circuits since the fuse is considered to be the primary source of spatter during short circuiting arc welding. In applicant's patents and application, incorporated by reference herein, other spatter producing dynamics of the welding process were recognized and prevented or modified by novel control concepts. One concept was to provide a high energy pulse following a slight time delay after the fuse so that the arcing condition subsequent to the fuse could be initiated by a high energy current pulse sometimes referred to as a "plasma boost" pulse. By using a high energy plasma boost current pulse immediately upon initiation of an arcing condition in the welding cycle, melting by anode heating at the tip of the welding wire being fed toward the molten metal pool on the workpiece occurred rapidly. This rapid melting allowed formation of a molten metal ball on the end of the wire of uniform size which was then moved toward the pool of molten metal as the wire was fed toward the workpiece. After the plasma boost pulse of current, a background current $I_B$ was passed through the arc to maintain the molten condition of the molten ball. By controlling the current and using a fixed time for the plasma boost pulse, the energy in the plasma boost pulse was regulated. The end of the wire was melted to form a molten metal ball having a somewhat uniform size based upon an amount of energy applied during the plasma boost current pulse. Thereafter, the arc was operated at a background current level maintaining a molten condition until the short circuit occurred.

By using a plasma boost pulse having a fixed time, a different amount of energy was introduced into the molten metal ball as the stick-out of the consumable electrode or welding wire varied. Thus, prior systems employing fixed time in the plasma boost current pulse could be used for automatic welding; however, semi-automatic welding wherein manual manipulation changed the extension presented difficulty. The plasma boost current pulse sometimes did not create enough heating on the end of the wire for melting. This caused stubbing. In addition, the duration of the welding cycle was not constant over long periods of time since there was substantial variations in the initiation of the short circuit condition of the individual cycles.

A unique driving system for the spatter control circuit has been developed by applicant wherein the individual welding cycles have a generally fixed frequency of repetition, such as 30–100 welding cycles per second. The power supply for the spatter control includes means for applying a succession of input current pulses across the wire and workpiece at a pulse frequency substantially greater than the generally fixed frequency of repetition of the welding cycles and pulse width changing means are provided for adjusting the current flow between the wire and workpiece many times during each of the welding cycles. In practice, the repetition is approximately 20 KHz so that the actual current flow during the welding cycle is adjusted at the rate determined by the period of a 20 KHz control signal. In this manner, accurate control is maintained without substantial interference with circuit parameters. When using this concept, a relatively low inductance is employed across the output leads of the power supply system. The low inductance allows the welding current to track the desired current profile during both the short circuit and the plasma stages. However, the low inductance does not produce sufficient current to consistently maintain the arc. The pulse width change means comprises a feedback control means for changing the pulse width of the input current pulses in the direction to maintain a preselected electrical characteristic.

Selectively actuated circuit means are used to change the electrical condition during various portions of each of the welding cycles. In this fashion, the feedback control can be shifted during various portions of the welding cycle to cause the current control to follow a preselected pattern or profile to accomplish the electrical parameters of the spatter control circuit as previously described.

The driving circuit for the spatter control system or spatter control circuit includes a pulse width modulator that is adjusted rapidly, such as at a frequency of 20 KHz. The width of the individual pulses during the various portions of the welding cycle are controlled by the feedback control circuit which tends to maintain a preselected condition at a control point. In this manner, this control point can be biased and subject to various electrical parameters during each welding cycle to adjust the profile of the welding cycle in accordance with any plan. Thus, the PINCH cycle can be controlled by current and have a different current during different portions. The plasma boost can be controlled by a constant wattage, constant current or constant voltage feedback arrangement with a preselected profile for the selected, controlled electrical characteristic. Thus, by using the high frequency and the selectively adjustable control concept a variety of individual welding cycles can be preprogrammed and controlled.

In normal short circuiting welding operations, a relatively large choke is provided in the welding circuit to control the welding current; however, such chokes are relatively expensive, heavy and provide substantial inductive reactance in the welding circuit. This inductive reactance, when employing a high frequency driver, reduces the capability of the welding circuit to follow the preselected profile determined by the command control circuit. In addition, a relatively large choke reduces the time required for a welding current to be reduced to an acceptable level preparatory to the fuse explosion at the end of the PINCH portion of the welding cycle. In prior applications, it has been suggested to place a resistor across the switch operated by the premonition circuit so that as the dv/dt or di/dt indicates an upcoming fuse explosion in the PINCH cycle, the switch is opened and the resistor is placed in series with the choke. This drastically reduces the welding current to decrease the amount of energy at the fuse explosion. However, this arrangement employs relatively high inductive reactance choke in the welding circuit, consumes energy and prevents accurate tracking of feedback profile. There is a reduction in the spatter at the fuse explosion; however, tracking by the D.C. chopper of the selected current profile during the remainder of the welding cycle is less accurate. For that reason, it has been suggested to employ a relatively small reactance choke in the welding circuit. In this manner, the premonition circuit actuated switch will drastically reduce the current at the fuse explosion and will also allow tracking of the feedback profile during other portions of the welding cycle. With the reduced choke size, the ripple factor of the welding current increases. Consequently, during the background portion of the cycle, especially after a plasma boost pulse, the ripple of the welding current can be such to extinguish the arc. When this occurs, the arc does not reignite until the next short circuit of the welding cycle has occurred. This causes some erratic behavior of the welding cycle which is to be avoided for smooth and quality welding. To overcome this difficulty, it has been suggested that a second power supply be provided, having a relatively low, fixed background current to maintain the minimum current available for the welding station at all times. Thus, the high ripple condition caused by use of a low inductive reactance choke will not diminish the available welding current below the background current from the second power supply. In this manner, a fixed background current is available at all times. The premonition circuit drops the welding current down to the background current by opening the premonition circuit switch and applying a snubber resistor in series with the choke. The low inductive reactance of the small choke allows accurate tracking of the profile by the feedback circuit whether it is controlled by voltage, current or wattage. However, the use of a separate and distinct power supply is expensive and as cumbersome as providing a relatively large choke. In addition, the background current from the second power supply was relatively high, i.e. in the neighborhood of 20 amperes.

THE INVENTION

It has been determined after substantial work in spatter control systems that the arc can be ignited with a relatively low available background current, less than about 10 amperes, with the high voltage created when the arc is extinguished or tends to extinguish. A continuous supply of relatively low current is provided in the spatter control system. When the arc tends to extinguish, the approximately 70 volts created between the workpiece and electrode will be sufficient voltage to establish and maintain an arc. Consequently, the present invention relates to the concept of providing a short circuiting control system where the background current is a continuous relatively low value, in the neighborhood of 5-10 amperes, which current is available to maintain the arc during all PLASMA portions of the welding cycle. This relatively low current can vary somewhat and need not be regulated or directed to the welding station through any special control system. By employing this inventive concept, a relatively small choke can be provided in the primary welding circuit, which is in series with the premonition switch, while an auxiliary circuit is continuously available to provide low background current across the welding station. In this manner, the low inductive reactance of the main choke allows accurate tracking of the profile for the welding cycle during both the PLASMA portion of the cycle and the PINCH portion of the cycle. The premonition circuit of the system will immediately drop the current to the unregulated low background current level. This current drop will be substantially instantaneous due to the low reactance of the main welding choke. The arcing problem caused by the increased ripple effect due to the low inductive reactance of the main choke is of no importance since the constant background current is available at all times during the PLASMA portion of the welding cycle.

Since the background current is relatively low it need not be extremely accurately controlled, there is no need for current regulation. Thus, the circuit for accomplishing the present invention is relatively simple and inexpensive. The background current circuit will include a large "kicker" choke with a series resistor to control the current flow through the kicker choke. Consequently, the background current has a continuously relatively constant value controlled by the large kicker choke. The small main choke in the welding circuit itself allows accurate current tracking, as well as a rapid decrease in the current at the time of the fuse explosion.

When the premonition circuit opens the premonition switch, a high initial current flows through the parallel resistor connected across the premonition switch. The resistor plus small inductance drastically reduces the current from the primary welding circuit. The current through the welding station will be substantially the background current through the large choke, which current has a value substantially less than about 10 amperes. Thus, the premonition circuit will drop the current flowing through the welding station immediately prior to the fuse explosion to less than about 10 amperes. This small choke in the main welding circuit is not large enough to maintain higher current flow through the welding station. Thus, the current is rapidly dropped from the pinch value to the background level of less than about 10 amperes. In this manner, the large choke in the background current circuit maintains the current at the low level, which low level could not be sustained by the choke in the main welding circuit. This causes an immediate reduction in current which is faster and lower than obtainable in prior circuits. The energy in the large kicker choke of the background current circuit produces enough voltage so that whenever the arc is broken, it tends to be reestablished. This is especially important after the plasma boost pulse of the welding system. This small background current has no effect upon the welding operation until the current through the welding station tends to be lower than the fixed 5-10 amperes of the background current circuit.

The low inductance in the main welding circuit allows accurate tracking. The high inductance in the background current allows start of the arc and maintenance of the arc at all times.

There is a reduction in the time necessary for the current to drop to the background level in response to actuation of the premonition circuit.

In accordance with the present invention, there is provided an improvement in a short circuiting arc welding system comprising a work station with a consumable electrode and workpiece, a D.C. power supply with a positive and a negative terminal, high frequency current control means for applying a welding circuit with a given time-based profile across the work station while the electrode is short circuited and while the electrode is spaced from the workpiece, a welding current circuit means including a first means for creating a first inductive reactance in series with the current control means and work station whereby the welding current follows the time-based profile in accordance with the first inductive reactance, the improvement comprises a background current circuit means between the power supply and the work station and in parallel with the current control means and first means for applying continuously a background current across the work station. This background current circuit means includes a second means for creating a second inductive reactance substantially greater than the first inductive reactance and a resistor means for controlling the background current flowing continuously from the power supply to the work station through the background current circuit means. In this manner, high inductive reactance in the background current circuit means provides a continuous current flow at a relatively low level, which is in the general range of 5-10 amperes, while the low inductive reactance of the welding circuit allows tracking of the profile determined by the high frequency current control means. By using this system, the arc is stabilized. In addition, current can be drastically reduced at the time of an impending fuse explosion.

The primary object of the present invention is the provision of a short circuiting arc welding system, which system accurately tracks a desired profile while employing a high frequency input current control circuit, with an auxiliary low background current circuit having a high inductive reactance.

Another object of the present invention is the provision of a short circuiting arc welding system and method, which system and method includes a low inductive reactance in a welding circuit and a high inductive reactance in a parallel, generally unregulated background current circuit.

Still a further object of the present invention is the provision of a system and method as defined above, which system and method tracks the desired profile, allows rapid decrease in the welding current and maintains the arc stability during the arc condition of the welding cycle.

These and other objects and advantages will become apparent from the following description taken together with the accompanying drawings:

PREFERRED EMBODIMENT

Figure 1:
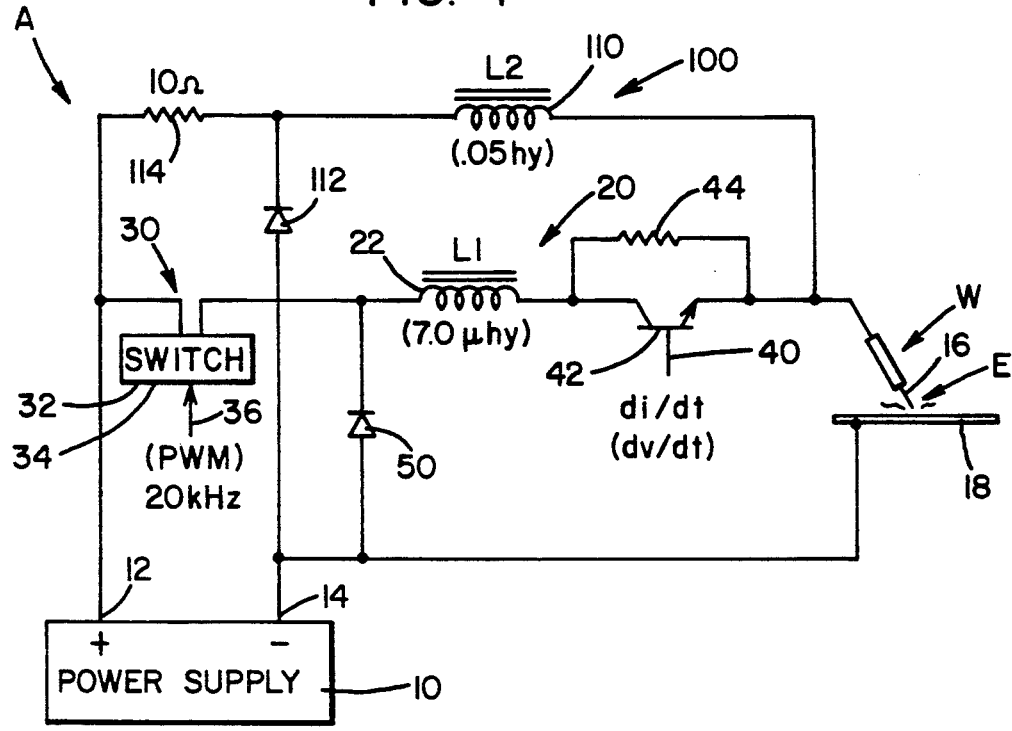
FIG. 1 is a wiring diagram illustrating the broad aspect of the present invention.
Figure 4:
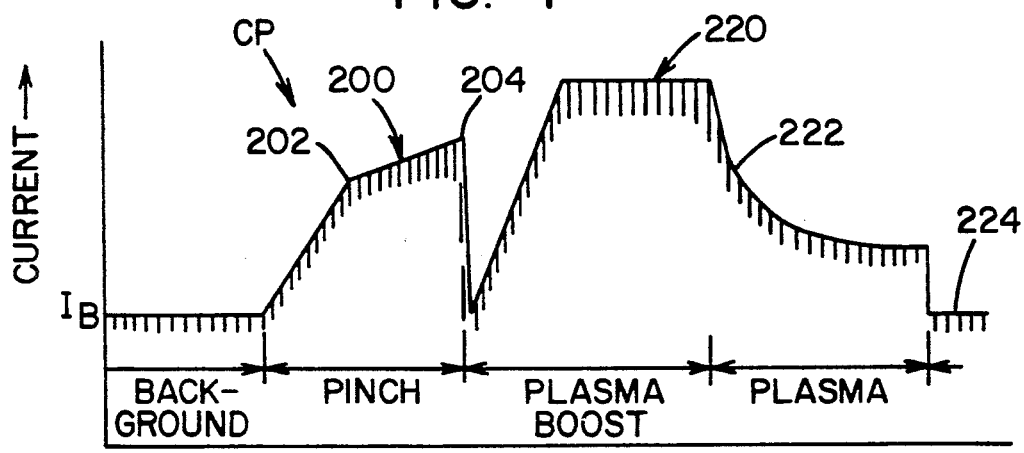
FIG. 4 is a current graph illustrating representative current profile of a single welding cycle employed in a system or method using the present invention.
Figure 5:
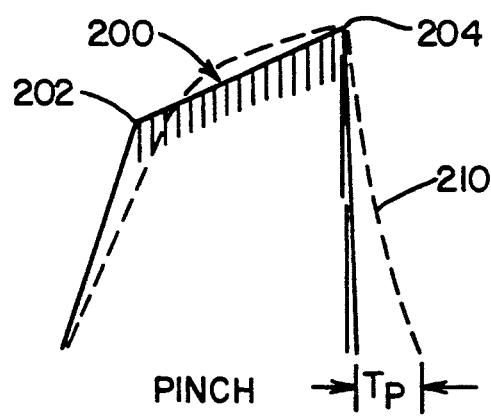
FIG. 5 is a partial view of the profile tracked by the present invention and illustrating the pinch portion of the welding cycle and illustrating a certain advantage of the present invention.

Referring now to the drawings wherein the showings are for the purpose of illustrating a preferred embodiment of the invention only and not for the purpose of limiting same, FIG. 1 shows a short circuiting arc welding system A connected to the output of a D.C. power supply 10 having output terminals 12, 14. This power supply could be a rectified output of a line transformer or any other appropriate D.C. source. System A directs the output of the D.C. power supply across a welding station W including a consumable electrode 16 and a workpiece 18. As in any short circuiting arc welding system, electrode 16 alternates between a short circuit condition with the electrode engaging workpiece 18 and an arcing condition where the electrode is spaced from the workpiece and an electric arc E is created between the workpiece and the electrode for the purposes of melting and maintaining molten the end of the electrode as it is fed toward the workpiece for a subsequent welding short circuit condition. This type of welding cycle is schematically illustrated in FIG. 4 and alternates between a short circuit condition and a plasma condition. During the plasma condition, it is necessary that the arc E is created and maintained at all times for the purposes of smooth and effective welding. The welding cycle which is repeated several times per second must be accurately controlled for the purpose of reducing spatter at various times during the welding cycle. System A is illustrated as having a welding current circuit 20 with a main choke 22 having a small inductive reactance such as approximately 7.0 microhenries. This relatively small, main choke can have different inductive reactance values while still practicing the invention. A high frequency current control device 30 includes a switch 32 having a pulse width modulated control system 34 which operates at a high frequency. In the preferred embodiment, the operating frequency of the pulse width modulated control system 34 is 20 KHz with a width of the successive current pulses determined by the voltage on line 36. As the feedback control system demands more current in the welding cycle, a higher voltage appears on line 36 causing a wider pulse during the next pulse from width modulating control system 34. Thus, the demanded current for the welding cycle is changed 20,000 times each second. Since the highest rate of the welding cycles is generally in the neighborhood of 100-400 cycles per second, many update pulses are provided in welding current circuit 20 during each welding cycle. By using a low inductive reactance for main choke 22, the actual current caused by operation of switch 32 of system 34 is directed through the welding station W between electrode 16 and workpiece 18. Thus, there is accurate tracking of the desired current profile during the total welding cycle of system A. In accordance with known practice, the welding current circuit 20 includes a premonition circuit having an output line 40 for controlling switch 42 having a parallel resistor or snubber 44. A free wheeling diode 50 completes the standard circuit with work station, including main choke 22 and switch 42.

Welding current circuit 20 directs current to work station W in accordance with the operation of the pulse width modulating control system 34 until the dr/dt (where arc is the electrode resistance) di/dt or dv/dt indicates an upcoming fuse during the PINCH cycle. When this detection occurs, the logic on line 40 changes polarity to open switch 42. This places resistor or snubber 44 in series with main choke 22. Since the main choke has a small inductive reactance, very little energy is stored in the welding current circuit. Consequently, the current flow caused by circuit 20 between the electrode and workpiece is immediately dropped to a level determined by resistor 44. The free wheeling diode 50 is employed during the welding cycle to allow current flow through switch 42 inbetween pulses from the high frequency current control 30. The free wheeling current is relatively small since its size is also determined by the small energy stored in main choke 22.

In accordance with the present invention, there is added to the welding current circuit 20 a generally parallel background current circuit 100 including a large reactance kicker choke 110. In the illustrated embodiment, this reactance is 0.05 Henries. Choke 110 is connected in parallel with choke 22 and on the opposite side of a relatively small freewheeling diode 112 from a current limiting resistor 114. The resistance in the preferred embodiment of resistor 114 is 10 Ohms to produce a current of approximately 5-7 amperes at all times during the operation of system A. Thus, irrespective of the operating condition of the welding current circuit 20, background current circuit 100 continues to provide 5-7 amps across the work station. In this manner, the welding current circuit 20 can have an extremely small choke 22 so that the current from control 30 accurately tracks the desired profile for the current during the welding cycle. Whenever the small inductive reactance of main choke 22 tends to allow the current across the welding station to be reduced below the background current of 5-7 amperes, this can not be done due to the parallel background current circuit 100. Consequently, the arc during the background portion of the cycle is stabilized. The background portion has an arc and is sometimes referred to as a plasma portion of the total welding cycle, which is divided into a short condition and an arc condition.

Figure 6:
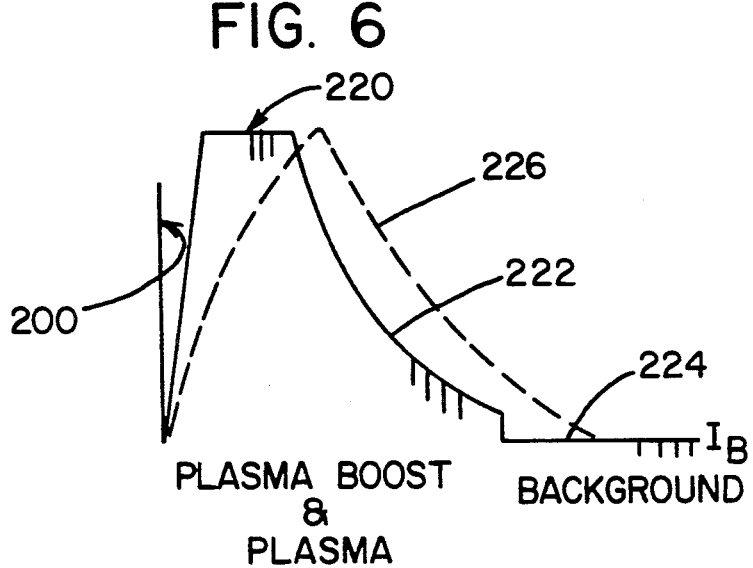
FIG. 6 is a partial view of the profile tracked by the present invention and illustrating the PLASMA BOOST and PLASMA portions of the welding cycle and explaining a certain advantage of the present invention; and, FIG. 7 is a view similar to FIG. 6 illustrating a system and method not employing the present invention.
Figure 7:
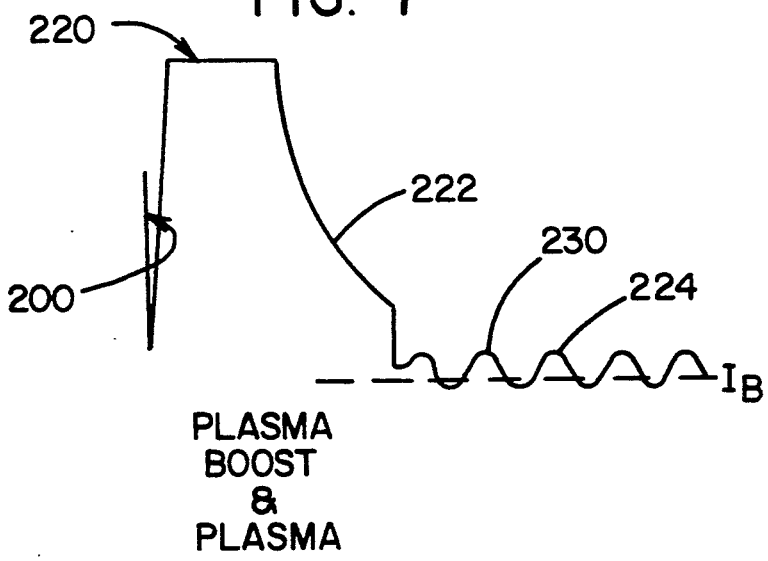

Referring now to FIGS. 4-7, the operation of the preferred embodiment of the present invention is schematically illustrated. FIG. 4 shows a desired current profile CP for a given welding cycle to produce low spatter. This profile is divided into a PINCH portion, a PLASMA BOOST portion, a PLASMA portion and a background portion wherein arc E is to be maintained. In the current profile CP illustrated in FIG. 4, PINCH portion 200 includes a break point 202 and a premonition circuit operating point 204. This portion of the current profile is illustrated in more detail in FIG. 5. In the past, a high inductance choke in the welding circuit 20 produced a lagging profile shown by the dashed line 210. Thus, when the premonition point 204 was reached, the current was dropped to the background level at a time indicated to be $T_P$. In accordance with the present invention, this time delay from the premonition point 204 until the current is dropped to the background level is substantially reduced. This occurs because of the low inductive reactance of main choke 22. This figure schematically illustrates one advantage created by use of the present invention. If the background current at the bottom of pinch curve 200 tends to be less than the background current of circuit 100, this circuit 100 maintains the lower current level. This is the background controlled current. The PLASMA BOOST portion 220 of current profile CP is illustrated in FIG. 4 as including a current decaying portion 222, referred to as the PLASMA portion. As is known, the PLASMA BOOST portion that is critical to the operation of the spatter control system is the constant current portion prior to the decay; however, the decay portion 222 can be referred to as the end of the PLASMA BOOST portion or the start of the PLASMA portion. Following this decaying portion 222, system A shifts to the background level 224. This background level maintains the plasma or arc and can be controlled by the high frequency current control 30. The current value at level 224 may be above or near background current level created by circuit 100. Circuit 100, in accordance with the present invention, maintains a preselected generally known background current below which the current flow through work station W can not drop. Thus, whatever the current provided by the high frequency control 30 may be, the current through the work station does not decrease below the maintained current value from circuit 100. The PLASMA BOOST and PLASMA portions are illustrated in FIG. 6 wherein the dashed lines 226 illustrate, somewhat schematically, what could occur with a high inductance for choke 22. As can be seen, the profile of current profile CP is generally not maintained. By reducing the inductive reactance to the extremely low level, as done in accordance with the present invention, profile CP is tracked. However, as shown in FIG. 7, this low inductance can substantially increase the ripple factor, especially at low current levels. This is illustrated as ripple 230. As can be seen this ripple could possibly be decreased below the sustaining current $I_B$. By maintaining this background current level, which is selected to maintain the arc E, irrespective of the ripple effect from power supply 10, the background current from circuit 100 is maintained. This is maintained by using a high inductive reactance kicker choke 110 and current limiting resistor 114. Thus, with the low value choke 22 allowing accurate tracking of the current profile CP, the background current circuit 110 maintains the arc. This improvement of the parallel background current circuit 100 allows immediate reduction of the current at the premonition point 204 and maintains the arc even during variations of current flow through welding current circuit 20.

Figure 2:
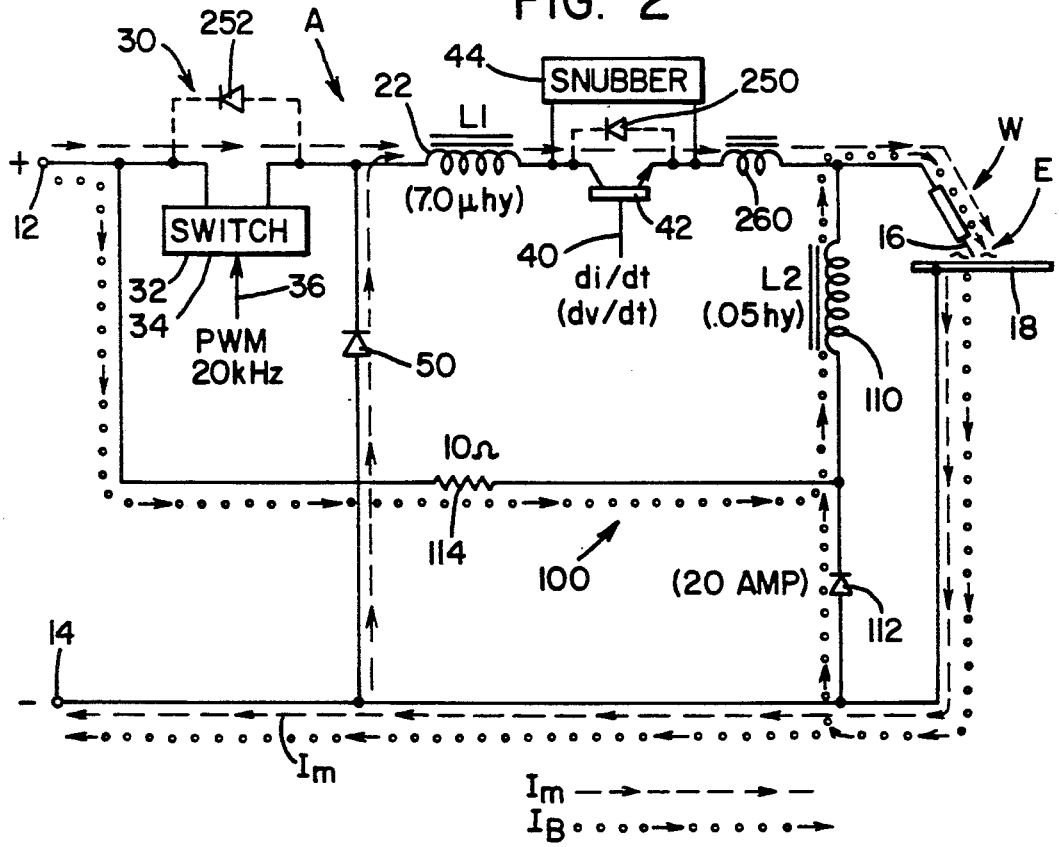
FIG. 2 is a wiring diagram illustrating the preferred embodiment of the present invention, with certain current flows illustrated on the wiring diagram.
Figure 3:
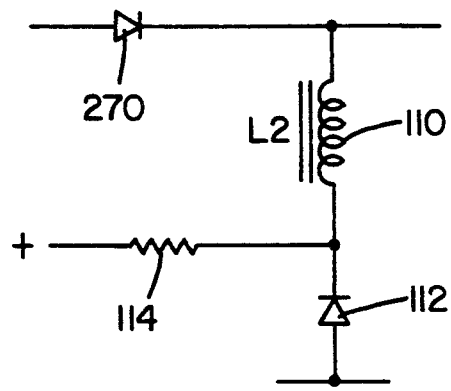
FIG. 3 is a partial wiring diagram showing the modification of the preferred embodiment illustrated in FIG. 2.

A detailed wiring diagram of the preferred embodiment of the invention is illustrated in FIG. 2 wherein the same numbers as employed in FIG. 1 are used for the same components. During normal welding, current flows in accordance with standard concepts and in the path depicted by the dashed arrows of FIG. 2. When the current across work station W decreases below the background current $I_B$, the background current is available through the large inductor 110 and in the dashed path shown in FIG. 2. When premonition switch 42 is opened, there is a tendency for the high energy available in choke 110 to pump current in a reverse direction through the normal anti-parallel diodes 250, 252 of switches 42, 32, respectively. To prevent that action, a saturating ferrite choke 260 is provided. This choke has a ferrite core which saturates at substantially greater than the background current $I_B$, but generally below the current of current profile CP. In practice, the saturation point is approximately 30 amperes and level 224 is about 50 amperes. During the welding operation, the welding current is normally above about 35 amperes. In the preferred embodiment the current of profile CP is about 50 amperes. The core of choke 260 is saturated during normal operation of the welding cycle to produce a low inductive reactance. At values substantially less than 30 amperes, as in the 5-7 amperes from circuit 100, the core cycle of choke 260 is not saturated. Thus, there is a high impedance at this choke during operation of only the kicker choke. This prevents back flow of current through diodes 250, 252 when the welding circuit is deactivated. Thus, during the sustained current from choke 110 the current does not flow from this kicker choke back to the power supply. A modification of this concept is illustrated in FIG. 3 wherein the saturating choke 260 is replaced by a diode 270. This diode prevents current flow from kicker choke 110 to the power supply.

By employing the present invention, profile CP can be tracked accurately. Any tendency to extinguish the arc will create a high voltage in the neighborhood of 70 volts, between the electrode and workpiece, which high voltage together with the available current from the kicker choke will maintain the arc E. This concept provides accurate current tracking for the total cycle. If the background portion prior to the pinch pulse is in the neighborhood of less than about 50 amperes, there is a possibility of a ripple which will decrease the available current to a value which will extinguish the arc. In the past, this has been prevented by employing a separate power supply. In accordance with the present invention, the use of a high reactance choke 110 in a parallel circuit maintains about 5.0-7.0 amperes of welding current at all times during the welding operation so that this current is available to combine with the substantial voltage drop across the electrode and workpiece to maintain the arc at all times, except during the short circuit condition of the welding operation. Whenever arc E tends to break, the voltage increases and a substantial amount of voltage is available for maintaining the arc. Thus, the invention recognizes the fact that the arc does not need to have an extremely high background current if the voltage is high across the electrode at the time of the arc break. Thus, a high energy choke providing a fixed background current can maintain stability of the arc. Since this background current is relatively low, in the neighborhood of 5-10 amperes and preferably in the neighborhood of 6-7 amperes, there is no need to have a regulated current supply. There is always a background current flowing either through the arc or through the short during the PINCH portion of the welding cycle. In accordance with the invention, the reactance of the first choke (L1) is substantially less than the kicker choke (L2). In the illustrated embodiment, choke L1 is 7.0 microhenries. Kicker choke L2 is 0.05 Henries. This difference is in the order of substantially more than a 1,000 times the inductance of the kicker choke over the normal welding choke. The background current is less than about 10 amperes. Thus, the plasma current which may be approximately 50 amperes can be available to maintain the arc unless the current for some reason drops below the background current level. Of course, the background current level 224 for profile CP could be in the neighborhood of 20 amperes. The preferred background current is 5-7 amperes. It is more than about 5 amperes and less than about 10 amperes. The control frequency preferably is 20 KHz. In the invention, the frequency is greater than about 10 KHz. This gives many current pulses during each current profile CP for maintaining accurate control of the profile. The saturating current of choke 260 can be in the general range of 20-30 amperes in the preferred example.

Having thus described the invention: the following is claimed:

1. In a short circuiting arc welding system comprising a work station with a consumable electrode and workpiece, a D.C. power supply with a positive and a negative output terminal; high frequency current control means for applying a welding current with a given time-based profile across said work station while said electrode is short circuited and while said electrode is spaced from said workpiece; a welding current circuit means including a first means for creating a first inductive reactance in series with said current control means and said work station whereby said welding current follows said time-based profile in accordance with said first inductive reactance, the improvement comprising: a background current circuit means between said power supply and said work station and in parallel with said current control means and said first means for applying a constant and a continuous background current across said work station, said background current circuit means including a second means for creating a second inductive reactance substantially greater than said first inductive reactance and a resistor means for controlling the background current flowing continuously from said power supply to said work station through said background current circuit means.

2. The improvement as defined in claim 1 wherein said first means is a first choke.

3. The improvement as defined in claim 2 wherein said second means is a second choke.

4. The improvement as defined in claim 3 wherein the inductance of said second inductive reactance is more than 1000 times the inductance of said first inductive reactance.

5. The improvement as defined in claim 3 wherein the inductance of said second inductive reactance is more than 1000 times the inductance of said first inductive reactance.

6. The improvement as defined in claim 1 wherein the inductance of said second inductive reactance is more than 1000 times the inductance of said first inductive reactance.

7. The improvement as defined in claim 6 wherein said resistor means includes a resistor for limiting said background current to less than about 10 amperes.

8. The improvement as defined in claim 7 wherein said resistor means includes a resistor for limiting said background current to more than about 5 amperes.

9. The improvement as defined in claim 7 wherein said resistor means includes a resistor for limiting said background current to the general range of 5-7 amperes.

10. The improvement as defined in claim 1 wherein said resistor means includes a resistor for limiting said background current to less than about 10 amperes.

11. The improvement as defined in claim 10 wherein said resistor means includes a resistor for limiting said background current to more than about 5 amperes.

12. The improvement as defined in claim 11 wherein said resistor means includes a resistor for limiting said background current to the general range of 5-7 amperes.

13. The improvement as defined in claim 10 wherein said resistor means includes a resistor for limiting said background current to the general range of 5-7 amperes.

14. The improvement as defined in claim 10 including premonition means for detecting the coming of a break in a short circuit between said electrode and said workpiece and means for disconnecting said first means from said work station in response to said detection whereby only said background current circuit means provides current to said work station as said short circuit is broken.

15. The improvement as defined in claim 14 wherein said background current circuit means and said welding current circuit means are joined at a junction prior to said electrode and current flow control means in said welding current circuit means for preventing background current to flow in a reverse direction through said welding current circuit means while said first means is disconnected from said work station.

16. The improvement as defined in claim 15 wherein said current flow control means is a saturating choke between said disconnecting means and said junction, said saturating choke having a saturation current substantially greater than said background current and generally less than said welding current.

17. The improvement as defined in claim 16 wherein said saturation current is in the range of 20-30 amperes.

18. The improvement as defined in claim 1 wherein said resistor means includes a resistor for limiting said background current to more than about 5 amperes.

19. The improvement as defined in claim 18 wherein said resistor means includes a resistor for limiting said background current to the general range of 5-7 amperes.

20. The improvement as defined in claim 1 wherein said resistor means includes a resistor for limiting said background current to the general range of 5-7 amperes.

21. The improvement as defined in claim 20 wherein said current control means is a switch means having a conductive state and a non-conductive state and means for switching said switch means between said states at a high frequency for directing many pulses of current from said power supply to said work station while said electrode is short circuited and/or directing many pulses of current from said power supply to said work station while said electrode is spaced from said workpiece.

22. The improvement as defined in claim 21 wherein said high frequency is a frequency greater than 10 KHz.

23. The improvement as defined in claim 22 including means for adjusting the length of said current pulses to track said time-based profile.

24. The improvement as defined in claim 21 including means for adjusting the length of said current pulses to track said time-based profile.

25. The improvement as defined in claim 20 including premonition means for detecting the coming of a break in a short circuit between said electrode and said workpiece and means for disconnecting said first means from said work station in response to said detection whereby only said background current circuit means provides current to said work station as said short circuit is broken.

26. The improvement as defined in claim 1 wherein said current control means is a switch means having a conductive state and a non-conductive state and means for switching said switch means between said states at a high frequency for directing many pulses of current from said power supply to said work station while said electrode is short circuited and/or directing many pulses of current from said power supply to said work station while said electrode is spaced from said workpiece.

27. The improvement as defined in claim 26, wherein said high frequency is a frequency greater than 10 KHz.

28. The improvement as defined in claim 1 including premonition means for detecting the coming of a break in a short circuit between said electrode and said workpiece and means for disconnecting said first means from said work station in response to said detection whereby only said background current circuit means provides current to said work station as said short circuit is broken.

29. The improvement as defined in claim 28 wherein said background current circuit means and said welding current circuit means are joined at a junction prior to said electrode and current flow control means in said welding current circuit means for preventing background current to flow in a reverse direction through said welding current circuit means while said first means is disconnected from said work station.

30. The improvement as defined in claim 29 wherein said current flow control means is diode.

31. The improvement as defined in claim 29 wherein said current flow control means is a saturating choke between said disconnecting means and said junction, said saturating choke having a saturation current substantially greater than said background current and generally less than said welding current.

32. The improvement as defined in claim 31 wherein said saturation current is in the range of 20-30 amperes.

33. A method of short circuiting arc welding comprising the steps of:
 (a) providing a work station with a consumable electrode and a workpiece;
 (b) providing a D.C. power supply with a positive and a negative output terminal;
 (c) applying a welding current with a given time-based profile across said work station while said electrode is short circuited and while said electrode is spaced from said workpiece;
 (d) creating first inductive reactance in series with said current control means and said work station whereby said welding current follows said time-based profile in accordance with said first inductive reactance;
 (e) applying a constant and a continuous background current across said work station;
 (f) creating a second inductive reactance substantially greater than said first inductive reactance for driving said background current across said work station; and,
 (g) controlling the background current flowing continuously from said power supply to said work station through said second inductive reactance to a value between the range of 5-10 amperes.

34. The method as defined in claim 33 wherein the inductance of said second inductive reactance is more than 1000 times the inductance of said first inductive reactance.

35. The method as defined in claim 33 including the further steps of:
 (h) detecting the coming of a break in a short circuit between said electrode and said workpiece; and,
 (i) disconnecting said first inductive reactance from said work station in response to said detection whereby only said background current provides current to said work station as said short circuit is broken.

36. The method as defined in claim 35 including the additional step of:
 (j) preventing background current from flowing in a reverse direction through said first inductive reactance while said first inductive reactance is disconnected from said work station.

37. The method as defined in claim 36 wherein said current flow prevention step is performed by a saturating choke between the means for performing said disconnecting step and said work station, said saturating choke having a saturation current substantially greater than said background current and generally less than said welding current.

38. The method as defined in claim 37 wherein said saturation current is in the range of 20-30 amperes.

39. In a short circuiting arc welding system comprising a work station with a consumable electrode and workpiece, a D.C. power supply with a positive and a negative output terminal; high frequency current control means for applying a welding current across said work station while said electrode is short circuited and while said electrode is spaced from said workpiece, a choke having a first inductance in series with said current control means and said work station, and a free wheeling diode in parallel with said choke and said work station, the improvement comprising: a second choke having a second inductance substantially greater than said first inductance, a resistor in series with said second choke to control the background current at said work station, said background current being less than about 20 amperes, means for connecting said resistor and second choke in parallel with said current control means and said first choke and a second free wheeling diode in parallel with said work station and said second choke.

40. The improvement as defined in claim 39 wherein said current control means is a switch means having a conductive state and a non-conductive state and means for switching said switch means between said states at a high frequency for directing many pulses of current from said power supply to said work station while said electrode is short circuited and/or directing many pulses of current from said power supply to said work station while said electrode is spaced from said workpiece.

41. The improvement as defined in claim 40 wherein said high frequency is a frequency greater than 10 KHz.

42. The improvement as defined in claim 39 including premonition means for detecting the coming of a break in a short circuit between said electrode and said workpiece and means for disconnecting said first choke from said work station in response to said detection.

43. The improvement as defined in claim 42 including current flow control means for preventing current flow in a reverse direction through said premonition means while said first choke is disconnected.

44. The improvement as defined in claim 43 wherein said current flow control means is a diode.

45. The improvement as defined in claim 43 wherein said current flow control means is a saturating choke having a saturation current substantially greater than the background current and generally less than the welding current.

46. The improvement as defined in claim 45 wherein said saturation current is in the range of 20-30 amperes.

* * * * *